United States Patent
Kitagawa et al.

(10) Patent No.: US 10,008,784 B2
(45) Date of Patent: Jun. 26, 2018

(54) TERMINAL FITTING FIXING STRUCTURE AND WIRE HARNESS

(71) Applicant: Yazaki Corporation, Tokyo (JP)

(72) Inventors: Hiroki Kitagawa, Shizuoka (JP); Yuya Yamada, Shizuoka (JP); Ryuta Fujii, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days. days.

(21) Appl. No.: 15/702,373

(22) Filed: Sep. 12, 2017

(65) Prior Publication Data

US 2018/0083372 A1    Mar. 22, 2018

(30) Foreign Application Priority Data

Sep. 16, 2016   (JP) ................. 2016-182207

(51) Int. Cl.
| | |
|---|---|
| *H01R 9/05* | (2006.01) |
| *H01R 4/20* | (2006.01) |
| *H01B 7/00* | (2006.01) |
| *H01R 4/64* | (2006.01) |
| *B60R 16/02* | (2006.01) |
| *B60R 16/03* | (2006.01) |

(52) U.S. Cl.
CPC ............. *H01R 4/20* (2013.01); *H01B 7/0045* (2013.01); *H01R 4/646* (2013.01); *B60R 16/0207* (2013.01); *B60R 16/03* (2013.01)

(58) Field of Classification Search
CPC .......... H01R 4/20; H01R 4/646; B60R 16/03; B60R 16/0207; H01B 7/0045
USPC ......................................................... 439/585
See application file for complete search history.

(56) References Cited

U.S. PATENT DOCUMENTS

| | | | | |
|---|---|---|---|---|
| 3,280,246 A | * | 10/1966 | Lawson | H01R 9/038 174/78 |
| 3,315,024 A | * | 4/1967 | Ball | H01R 4/20 174/75 C |
| 4,164,621 A | * | 8/1979 | Silva | H02G 15/105 156/49 |
| 4,280,749 A | * | 7/1981 | Hemmer | H01R 24/40 174/89 |
| 4,613,199 A | * | 9/1986 | McGeary | H01R 9/0518 439/585 |
| 5,767,449 A | * | 6/1998 | Gronowicz, Jr. | H01R 9/0512 174/78 |
| 5,965,847 A | * | 10/1999 | Tanaka | H01R 9/0527 174/84 R |

(Continued)

FOREIGN PATENT DOCUMENTS

JP    2006-269666 A    10/2006

*Primary Examiner* — Abdullah Riyami
*Assistant Examiner* — Vladimir Imas
(74) *Attorney, Agent, or Firm* — Kenealy Vaidya LLP

(57) ABSTRACT

A spacer has a first cylindrical portion where a primary crimped state of a braided member is formed between the spacer and a cable. After the primary crimped state is formed, in a state in which a second flange of the terminal fitting fitted around the cable and the braided member is in contact with a first flange, a sleeve fitted around a second cylindrical portion forms a crimped state of the braided member between the sleeve and the terminal fitting at the second cylindrical portion, so that the terminal fitting is fixed to the braided member.

5 Claims, 2 Drawing Sheets

(56) References Cited

U.S. PATENT DOCUMENTS

| | | | | |
|---|---|---|---|---|
| 6,186,802 B1* | 2/2001 | Masuda | H01R 13/6593 | 439/95 |
| 6,558,172 B2* | 5/2003 | Kanagawa | H01R 9/0524 | 439/582 |
| 6,583,357 B2* | 6/2003 | Rubenstein | H02G 3/0666 | 16/2.1 |
| 6,784,368 B2* | 8/2004 | Imai | H01R 9/0518 | 174/74 R |
| 7,044,756 B1* | 5/2006 | Asakura | H01R 9/032 | 439/607.41 |
| 7,048,579 B2* | 5/2006 | Montena | H01R 9/0524 | 439/578 |
| 7,147,513 B2* | 12/2006 | Wada | H01R 9/032 | 439/607.43 |
| 7,318,742 B2* | 1/2008 | Morikawa | H01R 9/0518 | 174/75 C |
| 7,893,354 B2* | 2/2011 | Albert | B60R 16/0222 | 174/72 A |
| 8,371,874 B2* | 2/2013 | Shaw | H01R 9/0524 | 439/578 |
| 8,602,797 B2* | 12/2013 | Omae | H01R 13/6592 | 439/99 |
| 8,808,012 B2* | 8/2014 | Omae | H01R 4/646 | 439/98 |
| 9,434,328 B2* | 9/2016 | Oka | H01R 4/20 | |
| 9,692,146 B2* | 6/2017 | Justi | H01R 13/6583 | |
| 9,793,622 B2* | 10/2017 | Ehret | H01R 9/05 | |
| 9,865,942 B2* | 1/2018 | Hamada | H01R 9/0518 | |
| 9,876,321 B2* | 1/2018 | Sasaki | H01R 24/38 | |
| 2001/0053633 A1* | 12/2001 | Konda | H01R 9/0518 | 439/625 |
| 2002/0106918 A1* | 8/2002 | Saito | H01R 9/0524 | 439/98 |
| 2012/0190238 A1* | 7/2012 | Omae | H01R 9/0518 | 439/620.01 |
| 2013/0288528 A1* | 10/2013 | Sakaizawa | H01R 13/518 | 439/626 |
| 2013/0337705 A1* | 12/2013 | Kalayjian | H01R 9/0518 | 439/889 |

* cited by examiner

TERMINAL FITTING FIXING STRUCTURE AND WIRE HARNESS

CROSS-REFERENCE TO RELATED APPLICATION(S)

The present application claims priority to and incorporates by reference the entire contents of Japanese Patent Application No. 2016-182207 filed in Japan on Sep. 16, 2016.

BACKGROUND OF THE INVENTION

1. Field of the Invention

The present invention relates to a terminal fitting fixing structure and a wire harness.

2. Description of the Related Art

In related art, unshielded cables are used for some cables provided between a power source and various electronic devices mounted on a vehicle and electrically connecting the power source with the electronic devices, for example. An unshielded cable is constituted by a conductive core and an insulator covering the core. Since electromagnetic noise may be caused by high-voltage current output from a power source and flowing through an unshielded cable, a braided member covers part of the outer surface of the unshielded cable. The braided member has ends to each of which a terminal fitting electrically connecting with the vehicle body of the vehicle is attached. The braided member is electrically connected with the vehicle body via the terminal fittings, which prevents or reduces influence of electromagnetic noise generated in the unshielded cable on electronic devices such as a radio, for example.

As an example of a terminal fitting fixing structure for fixing a terminal fitting to a braided member, Japanese Patent Application Laid-open No. 2006-269666 proposes a terminal fitting fixing structure in which a terminal fitting is fitted around an unshielded cable and a braided member such that the unshielded cable and the braided member pass through the terminal fitting, an end of the braided member is folded back in the axial direction, a sleeve is further fitted around the terminal fitting, and the sleeve is crimped onto the terminal fitting with the folded back braided member sandwiched between the sleeve and the terminal fitting, so that the terminal fitting is fixed to the braided member.

In the terminal fitting fixing structure, however, the movements of the terminal fitting and the braided member relative to each other are not restricted until the sleeve is crimped onto the terminal fitting. Thus, even when the terminal fitting fitted around the cable and the braided member is positioned at a predetermined position relative to the braided member, the terminal fitting may be shifted in position relative to the braided member during mounting of the terminal fitting fixing structure, which may lower workability.

SUMMARY OF THE INVENTION

The present invention has been made in view of the above, and an object thereof is to provide a terminal fitting fixing structure and a wire harness capable of fixing a terminal fitting to a braided member in a state in which movements of the terminal fitting and the braided member relative to each other are suppressed.

In order to achieve the above mentioned object, a terminal fitting fixing structure according to one aspect of the present invention includes a braided member covering part of a cable including a core and an insulator, the braided member being formed by braided metal wires; a spacer having a first cylindrical portion through which the braided member passes, and a first flange protruding radially outward from an end on a first side of the spacer in an axial direction; a terminal fitting having a second cylindrical portion through which the braided member passes, and a second flange electrically connected with a ground member and protruding radially outward from an end on a second side of the terminal fitting in the axial direction; and a sleeve through which the second cylindrical portion passes in a state in which an end of the braided member on the first side being folded back is sandwiched between the sleeve and the second cylindrical portion on the first side in the axial direction of the terminal fitting, wherein the first cylindrical portion of the spacer is deformed radially inward to form a crimped state of the braided member between the spacer and the cable, and the sleeve is deformed radially inward and forms a crimped state of the braided member at least between the sleeve and the terminal fitting in a contact state in which the second flange is in contact with the first flange.

According to another aspect of the present invention, in the terminal fitting fixing structure, it is preferable that the end of the braided member on the first side is at least partially in contact with the second flange.

According to still another aspect of the present invention, in the terminal fitting fixing structure, it is preferable that the second flange has a radially outer end protruding toward the second side along the axial direction, and covers a radially outer end of the first flange.

According to still another aspect of the present invention, a wire harness includes a cable including a core and an insulator; a braided member covering part of the cable and being formed by braided metal wires; a spacer having a first cylindrical portion through which the braided member passes, and a first flange protruding radially outward from an end on a first side of the spacer in an axial direction; a terminal fitting having a second cylindrical portion through which the braided member passes, and a second flange electrically connected with a ground member and protruding radially outward from an end on a second side of the terminal fitting in the axial direction; and a sleeve through which the second cylindrical portion passes in a state in which an end of the braided member on the first side being folded back is sandwiched between the sleeve and the second cylindrical portion on the first side in the axial direction of the terminal fitting, wherein the first cylindrical portion of the spacer is deformed radially inward to form a crimped state of the braided member between the spacer and the cable, and the sleeve is deformed radially inward and forms a crimped state of the braided member at least between the sleeve and the terminal fitting in a contact state in which the second flange is in contact with the first flange.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE
PREFERRED EMBODIMENTS

An embodiment of a terminal fitting fixing structure and a wire harness according to the present invention will now be described in detail with reference to the drawings. Note that the present invention is not limited to the embodiment. In addition, components in the embodiment below may include those which are easily conceivable to those skilled in the art or those which are substantially the same. Furthermore, various omissions, substitutions and changes can be made on the components in the embodiment below without departing from the gist of the invention.

Embodiment

Figure 1:
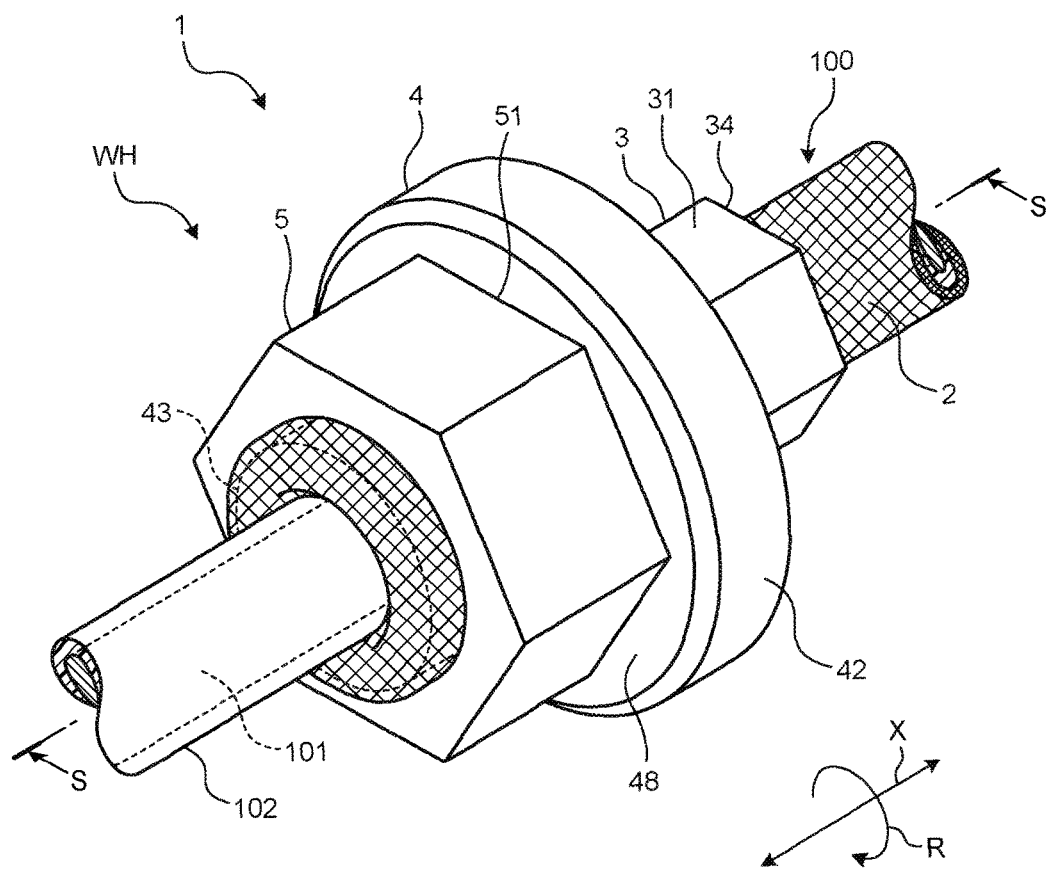
FIG. 1 is a perspective view of a terminal fitting fixing structure according to an embodiment.
Figure 2:
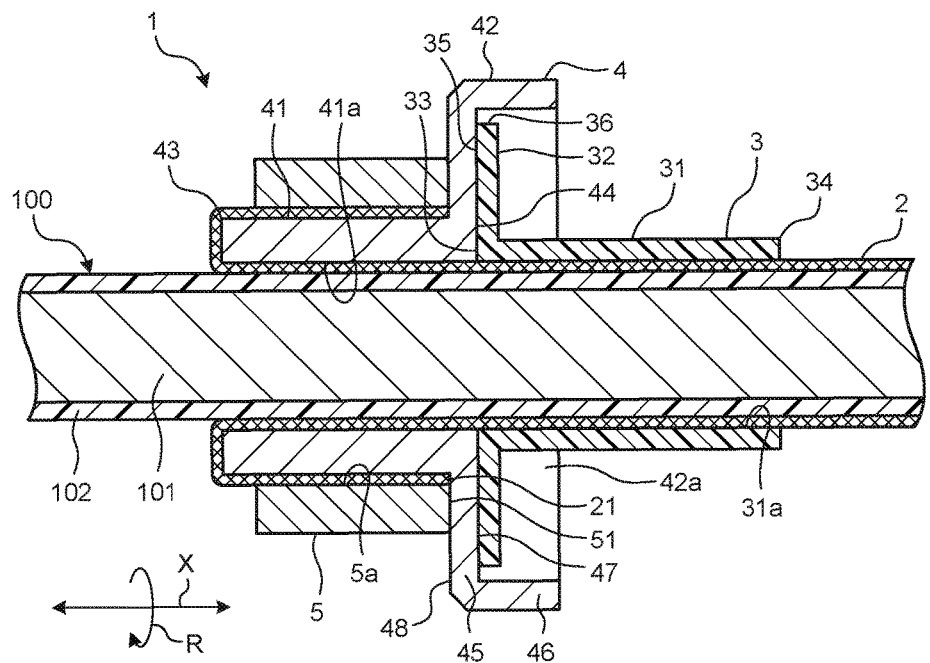
FIG. 2 is a cross-sectional view of the terminal fitting fixing structure according to the embodiment.
Figure 3:
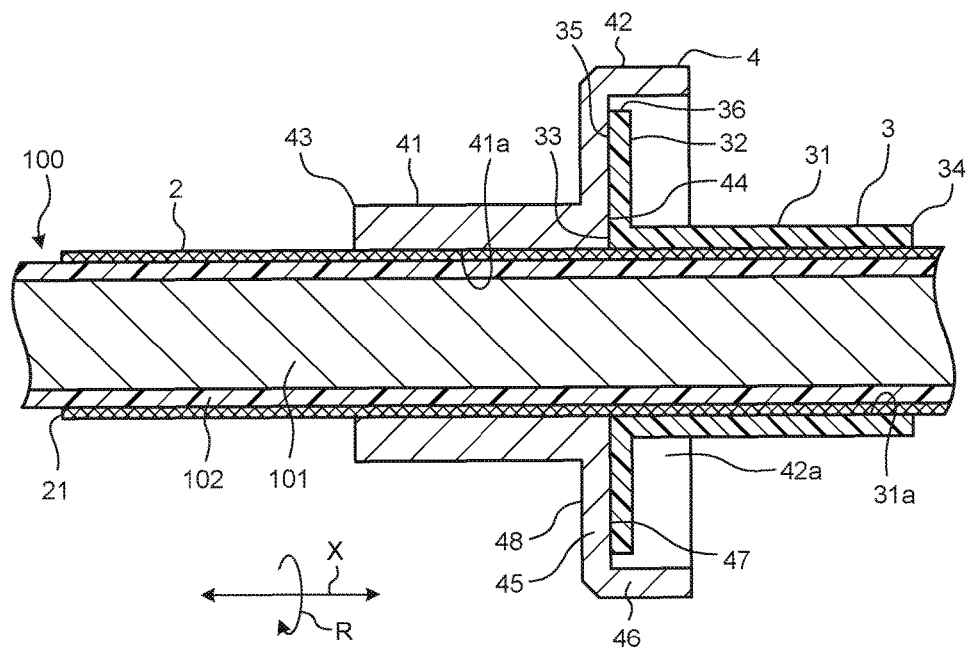
FIG. 3 is an explanatory view of mounting of the terminal fitting fixing structure according to the embodiment.

First, a terminal fitting fixing structure and a wire harness according to the embodiment will be described. FIG. 1 is a perspective view of the terminal fitting fixing structure according to the embodiment. FIG. 2 is a cross-sectional view of the terminal fitting fixing structure according to the embodiment. FIG. 3 is an explanatory view of mounting of the terminal fitting fixing structure according to the embodiment. FIG. 2 is a cross-sectional view along S-S in FIG. 1. FIG. 3 illustrates a state before a sleeve is fitted around a cylindrical portion in the terminal fitting fixing structure. In each of the drawings, the X direction corresponds to the axial direction of a terminal fitting. The R direction is a direction perpendicular to the X direction, which corresponds to the circumferential direction of the terminal fitting.

As illustrated in FIG. 1, a terminal fitting fixing structure 1 is a fixing structure for fixing a terminal fitting 4 to a braided member 2 covering part of a cable 100. The terminal fitting fixing structure 1 includes the braided member 2, a spacer 3, the terminal fitting 4, and a sleeve 5.

The cable 100 is part of a component of a wire harness WH. Note that the wire harness WH electrically connects components of a vehicle with one another, and is constituted by cables including the cable 100 to which the terminal fitting fixing structure 1 is applied, connectors, an electrical connection box, and the like. The cable 100 is flexible, and is provided between a power source, which is not illustrated, mounted on a vehicle and various electronic devices operated by the power from the power source so as to electrically connect these components with each other. As illustrated in FIG. 1, the cable 100 is an unshielded cable constituted by a core 101 and an insulator 102. Note that an unshielded cable refers to a cable that includes no shield member such as the braided member 2 as a component, unlike a shielded cable having the entire outer surface along the axial direction covered with a shield member such as the braided member 2. The core 101 is a wire made of conductive metal, and transmits current supplied from the power source to various electronic devices. The insulator 102 is insulating synthetic resin such as vinyl chloride, or the like, and covers the core 101 through insert molding or the like to prevent exposure of the core 101 to the outside.

The braided member 2 is a so-called electromagnetic shield member for preventing or reducing influence of electromagnetic noise caused by high-voltage current flowing through the cable 100 on electronic devices such as a radio, for example. As illustrated in FIG. 1, the braided member 2 covers a part along the axial direction of the cable 100. Thus, in a region of the cable 100 covered by the braided member 2, electromagnetic noise is blocked from radiating to the outside of the cable 100 by the braided member 2. The braided member 2 is formed by braiding a plurality of metal wires, that is, braided wires that are wires made of metal into a net-lie shape, and thus has flexibility. Thus, when the cable 100 bends, the braided member 2 is capable of bending following the cable 100. As illustrated in FIGS. 1 to 3, the spacer 3 and the terminal fitting 4 are fixed to a first end 21 of the braided member 2 in the axial direction. A spacer 3 and a terminal fitting 4 are also fixed to a second end, which is not illustrated, of the braided member 2 in the axial direction. As illustrated in FIGS. 1 and 3, the first end 21 of the braided member 2 is folded back in the axial direction and positioned to face the outer surface of a second cylindrical portion 41, which will be described later, of the terminal fitting 4 in the radial direction. The folded first end 21 of the braided member 2 is at least partially in contact with a second flange 42, which will be described later.

The spacer 3 restricts movement of the braided member 2 relative to the cable 100 in a primary crimped state, which will be described later, before the terminal fitting 4 is fixed to the braided member 2. As illustrated in FIGS. 1 to 3, the spacer 3 includes a first cylindrical portion 31 and a first flange 32.

The first cylindrical portion 31 is formed in a cylindrical shape having a through-hole 31a along the axial direction. The first cylindrical portion 31 has openings formed at first and second ends 33 and 34 in the axial direction, and the through-hole 31a connects the openings. The through-hole 31a is formed to have a hole diameter that is slightly larger than the diameter of the braided member 2 covering the cable 100 before the primary crimped state. The cable 100 and the braided member 2 covering the cable 100 are inserted in the through-hole 31a, pass through the first cylindrical portion 31, and are exposed to the outside of the spacer 3 through the openings formed at the first and second ends 33 and 34.

At this point, as illustrated in FIGS. 1 to 3, the first cylindrical portion 31 is brought into the primary crimped state in which the braided member 2 is crimped between the spacer 3 and the cable 100 with the braided member 2 covering the cable 100 extending through the first cylindrical portion 31. In the primary crimped state, the first cylindrical portion 31 is deformed radially inward into a hexagonal shape as viewed in the axial direction. The spacer 3 in the primary crimped state is deformed to be inscribed in or positioned radially inward of the outer circumference circle of the spacer 3 as viewed in the axial direction before the primary crimped state.

The first flange 32 protrudes radially outward at the first end 33 of the first cylindrical portion 31 and is formed around the whole circumference. The first flange 32 comes in contact with the second flange 42 in the axial direction so as to come in contact with the terminal fitting 4. In the primary crimped state, the first flange 32 is positioned closer to the end 21 of the braided member 2 than the first cylindrical portion 31 is.

The terminal fitting 4 is electrically connected to a ground member, and transmits electromagnetic noise blocked by the braided member 2 to the vehicle body side. The terminal fitting 4 in the embodiment is contained in and electrically connected with a shield shell, which is not illustrated and which is the ground member. Since the shield shell is electrically connected with the vehicle body (body), the terminal fitting 4 is indirectly electrically connected with the vehicle body. The terminal fitting 4 is made of conductive metal. The terminal fitting 4 is fixed to a predetermined position relative to the vehicle body such that the braided member 2 covers a region of the cable 100 where electromagnetic noise is to be blocked from the vehicle body. As illustrated in FIGS. 2 and 3, the terminal fitting 4 includes the second cylindrical portion 41 and the second flange 42.

The second cylindrical portion 41 is formed in a cylindrical shape having a through-hole 41a along the axial direction. The second cylindrical portion 41 has openings formed at first and second ends 43 and 44 in the axial direction, and the through-hole 41a connects the openings. The through-hole 41a is formed to have a hole diameter that is slightly larger than the diameter of the braided member 2 covering the cable 100 before a secondary crimped state, which will be described later. The cable 100 and the braided member 2 covering the cable 100 are inserted in the through-hole 41a, pass through the second cylindrical portion 41, and are exposed to the outside of the terminal fitting 4 through the openings formed at the first and second ends 43 and 44. At this point, as illustrated in FIGS. 1 to 3, the second cylindrical portion 41 is bought into the secondary crimped state in which the braided member 2 is crimped between the terminal fitting 4 and the sleeve 5 with the braided member 2 sandwiched between the second cylindrical portion 41 and the sleeve 5.

The second flange 42 comes electrically in contact with the shield shell. The second flange 42 protrudes radially outward at the second end 44 of the second cylindrical portion 41 and is formed around the whole circumference. The second flange 42 has a base portion 45, a distal end portion 46, and an insertion space portion 42a.

The base portion 45 protrudes radially outward from the outer surface of the second cylindrical portion 41 at the end 44 and is formed around the whole circumference. The base portion 45 is formed to be larger than the outer diameter of the first flange 32 and the outer diameter of the sleeve 5. The base portion 45 has end faces 47 and 48, which are opposite to each other in the axial direction. The second end face 47 in the axial direction is a face defining the insertion space portion 42a. The second end face 47 comes in contact with an end face 35 of the first flange 32 in the axial direction. The first end face 48 in the axial direction comes in contact with at least part of the first end 21 of the folded braided member 2 in a fixed state in which the terminal fitting 4 is fixed to the braided member 2.

The distal end portion 46 is formed such that a radially outer end of the base portion 45 protrudes in a direction opposite to a direction in which the other end of the base portion 45 in the axial direction, that is, the second cylindrical portion 41 is formed. The distal end portion 46 covers a radially outer end 36 of the first flange 32 in a contact state in which the second flange 42 of the terminal fitting 4 in the fixed state is in contact with the first flange 32.

The insertion space portion 42a is formed by the base portion 45 and the distal end portion 46. The insertion space portion 42a communicates with the outside of the terminal fitting 4. The insertion space portion 42a contains therein the first flange 32 in the fixed state.

As illustrated in FIG. 2, the second cylindrical portion 41 extends through the sleeve 5 in a state in which the first end 21 of the braided member 2 is sandwiched on the first end 43 side in the axial direction of the terminal fitting 4. The sleeve 5 is formed into a cylindrical shape having a through-hole 5a along the axial direction. The through-hole 5a is formed to have a hole diameter that is slightly larger than the outer diameter of second cylindrical portion 41 in a state covered with the folded braided member 2 before the secondary crimped state.

The sleeve 5 is fitted around the second cylindrical portion 41 of the terminal fitting 4 after the primary crimped state, sandwiches the first end 21 of the braided member 2 with the second cylindrical portion 41 in the contact state in which the second flange 42 of the terminal fitting 4 is in contact with the first flange 32, and is crimped onto the terminal fitting 4 in a state extending through the second cylindrical portion 41. In the secondary crimped state, the sleeve 5 is deformed radially inward into a hexagonal shape as viewed in the axial direction. The sleeve 5 provides greater fixing strength to fix the terminal fitting 4 to the braided member 2. In addition, the sleeve 5 forms the secondary crimped state of the braided member 2 between the sleeve 5 and the terminal fitting 4, so as to securely electrically connect the braided member 2 with the terminal fitting 4. In the secondary crimped state, a second end face 51 of the respective ends in the axial direction of the sleeve 5 is in contact with the first end face 48 of the second flange 42.

An example of the work for mounting the terminal fitting fixing structure 1 will be described. Here, the spacer 3 and the terminal fitting 4 to be mounted on the first end 21 of the braided member 2 will be described. First, an operator puts the through-hole 31a of the spacer 3 on the cable 100 from the second end 34 side of the first cylindrical portion 31. The operator further slides the spacer 3 such that the braided member 2 covering the cable 100 is inserted in the through-hole 31a. The operator further slides the spacer 3 such that the cable 100 and the braided member 2 pass through the spacer 3 and are exposed from the first end 33 of the first cylindrical portion 31. Subsequently, the operator positions the spacer 3 relative to the braided member 2 so that the terminal fitting 4 put on the cable 100 can come into contact with the spacer 3 in the axial direction at a predetermined position. Note that the predetermined position of the terminal fitting 4 is a position at which the terminal fitting 4 is in contact with the spacer 3 in the axial direction and at which the first end 21 of the braided member 2 can be at least partially in contact with the first end face 48 of the second flange 42 when being folded back at the first end side in the axial direction of the terminal fitting 4, that is, at the end 43 side. Subsequently, the operator caulks the first cylindrical portion 31 with a jig, which is not illustrated, to carry out so-called primary crimping. As a result of caulking, the first cylindrical portion 31 is deformed radially inward into a hexagonal shape as viewed in the axial direction, and the primary crimped state of the first cylindrical portion 31 on the braided member 2 and the cable 100 is formed. This suppresses relative movements of the braided member 2 and the spacer 3, and the primary crimping work on the first cylindrical portion 31 is completed.

Subsequently, the operator puts the through-hole 41a of the terminal fitting 4 on the cable 100 exposed from the end 33 of the spacer 3 from the second flange 42 side. The operator further slides the terminal fitting 4 such that the braided member 2 covering the cable 100 is inserted in the through-hole 41a, the cable 100 and the braided member 2 pass through the terminal fitting 4, and are exposed from the end 43 of the second cylindrical portion 41. The operator further slides the terminal fitting 4 such that the first flange 32 of the spacer 3 is inserted in the insertion space portion 42a of the second flange 42, and the second end face 47 of the second flange 42 in the axial direction is brought into contact with the end face 35 of the first flange 32. As a result of the second end face 47 of the second flange 42 coming into contact with the end face 35 of the first flange 32 in the contact state, further sliding of the terminal fitting 4 is restricted, and fitting of the terminal fitting 4 around the cable 100 and the braided member 2 is completed.

Subsequently, the operator folds the end 21 of the braided member 2 back in the axial direction from the end 43 of the second cylindrical portion 41, and positions the folded first end 21 to face the outer surface of the second cylindrical portion 41 from outside of the second cylindrical portion 41 in the radial direction. Subsequently, the operator brings at least part of the first end 21 into contact with the first end face 48 of the second flange 42. At this point, the braided member 2 is in a state covering the entire outer surface of the second cylindrical portion 41.

Subsequently, the operator puts the sleeve 5 on the cable 100 toward the terminal fitting 4 in contact with the spacer 3 in the primary crimped state. The operator further slides the sleeve 5, so that the second end face 51 of the sleeve 5 comes into contact with the first end face 48 of the second flange 42. This restricts further sliding of the sleeve 5, and fitting of the sleeve 5 to the terminal fitting 4 is completed. Subsequently, the operator caulks the sleeve 5 by using the jig, which is not illustrated, to carry out so-called secondary crimping as illustrated in FIGS. 1 and 2. As a result of caulking, the sleeve 5 is deformed radially inward into a hexagonal shape, and the secondary crimped state of at least the sleeve 5, the braided member 2, and the second cylindrical portion 41 is formed. This suppresses relative movements between the braided member 2, and the sleeve 5 and the terminal fitting 4, that is, relative movements of the sleeve 5 and the terminal fitting 4 with the braided member 2 therebetween, and the secondary crimping work on the sleeve 5 at the second cylindrical portion 41 is completed. In this manner, the work for mounting the terminal fitting fixing structure 1 is completed.

As described above, in the terminal fitting fixing structure 1 according to the embodiment, the primary crimped state of the braided member 2 between the cable 100 and the spacer 3 is formed, and the second flange 42 of the terminal fitting 4 is brought into contact with the first flange 32 of the spacer 3 so that the contact state is formed, which allows the end 21 of the braided member 2 to be folded back and positioned to radially outside of the outer surface of the second cylindrical portion 41 in the state in which relative movements of the terminal fitting 4 and the braided member 2 are prevented, which facilitates the work of folding back the braided member 2. Furthermore, since the sleeve 5 is put on the second cylindrical portion 41 in the state in which the folded first end 21 is sandwiched therebetween and the movement of the terminal fitting 4 relative to the cable 100 and the braided member 2 is prevented by the spacer 3 in the primary crimped state when the secondary crimping is carried out on the second cylindrical portion 41, the terminal fitting 4 is prevented from being shifted in position relative to the braided member 2 until the secondary crimping is carried out, which allows the secondary crimping of the terminal fitting 4 to be carried out at a predetermined position relative to the braided member 2. Consequently, since the terminal fitting fixing structure 1 is capable of fixing the terminal fitting 4 to the braided member 2 in the state in which movements of the terminal fitting 4 and the braided member 2 relative to each other are prevented, the workability of the mounting of the terminal fitting fixing structure 1 is improved.

In a case where the primary crimping and the secondary crimping are formed at the same position in the terminal fitting fixing structure 1, such as at the second cylindrical portion 41 of the terminal fitting 4, for example, the secondary crimping needs to be carry out in such a manner that the circumferential positions of the jig correspond to the hexagonal shape formed by the primary crimping so that the six corners of the hexagonal shape of the sleeve 5 formed by the secondary crimping as viewed in the axial direction match those of the hexagonal shape of the second cylindrical portion 41 formed by the primary crimping. For example, if the sleeve 5 is caulked with the positions of the corners of the hexagonal shape formed by the secondary crimping being shifted from those of the corners of the hexagonal shape formed by the primary crimping, a gap or distortion may be caused between the shape of the second cylindrical portion 41 resulting from the primary crimping and the shape of the sleeve 5 resulting from the secondary crimping, which may disadvantageously lower the fixing strength of crimping after the caulking work. On the other hand, adjustment of the circumferential positions of the jig to match the hexagonal shape formed by the secondary crimping with the hexagonal shape formed by the primary crimping lowers the workability. Thus, in the terminal fitting fixing structure 1 according to the embodiment, since the primary crimping and the secondary crimping are carried out on different members, which are the spacer 3 and the terminal fitting 4, that is at different positions, the positions of the hexagonal shapes formed by the primary crimping and the secondary crimping need not be considered, which improves the workability.

Furthermore, in the terminal fitting fixing structure 1 according to the embodiment, the primary crimping and the secondary crimping are carried out on respective sides along the axial direction of the second flange 42 in contact with the ground member. Thus, in a case where a space portion of the ground member in which the terminal fitting fixing structure 1 is positioned is limited, such as a case where the length of the terminal fitting 4 in the axial direction is limited owing to a limitation in a region of the ground member in which the terminal fitting 4 can be positioned, for example, the terminal fitting 4 only needs to have the second cylindrical portion on which the secondary crimping can be carried out, and the spacer 3 on which the primary crimping can be positioned outside of the ground member. Consequently, even in a case where the space portion of the ground member in which the terminal fitting fixing structure 1 is positioned is limited, the terminal fitting 4 can be positioned.

Furthermore, in the terminal fitting fixing structure 1 according to the embodiment, when the braided member 2 is folded in the axial direction from the end 43 of the second cylindrical portion 41 such that the length in the axial direction of the first end 21 of the braided member 2 exposed from the second cylindrical portion 41 is the length of the outer surface of the second cylindrical portion 41 to the second flange 42 in the axial direction, at least part of the end 21 of the braided member 2 is brought into contact with the end face 48 of the second flange 42. Thus, the operator need not carry out the folding work while positioning the first end 21 to the position on the second cylindrical portion 41 where the sleeve 5 is to be crimped, which improves the workability.

Furthermore, the second flange 42 in the embodiment has the distal end portion 46 protruding in the other direction along the axial direction in the state in contact with the first flange 32, and covers the end 36 of the first flange 32. In comparison with a structure in which the second flange 42 has no distal end portion 46, the second flange 42 comes in contact with the ground member over a wider area, which improves the electrical connectivity between the terminal fitting 4 and the ground member.

The wire harness WH of the embodiment includes the terminal fitting fixing structure 1, and allows the terminal fitting 4 to be fixed to the braided member 2, which improves the workability in mounting of the terminal fitting fixing structure 1.

While the end face 35 of the first flange 32 and the end face 47 of the second flange 42 are in contact with each other in the contact state in the terminal fitting fixing structure 1 according to the embodiment, the terminal fitting fixing structure is not limited thereto. For example, a structure in which the end face opposite to the end face 35 of the first flange 32 and the end face 47 of the second flange 42 are in contact with each other may be used. In this case, the first cylindrical portion 31 is positioned on the same side as the second cylindrical portion 41 with respect to the first flange 32 and the second flange 42, and positioned radially inside of the through-hole 41a. As a result, the region where the terminal fitting fixing structure 1 is positioned in the space portion on the vehicle body side is present only in one direction with respect to the second flange 42, which produces an advantageous effect in a case where the region of the space portion is further limited.

In the terminal fitting fixing structure and the wire harness according to the embodiment, the second flange is brought into contact with the first flange after forming a crimped state in which the braided member is crimped between the cable and the spacer at the first cylindrical portion, the first end of the braided member is folded back and positioned to face the outer surface of the second cylindrical portion, and the braided member is crimped between the terminal fitting and the sleeve fitted around the second cylindrical portion. Therefore, the terminal fitting can be fixed to the braided member in a state in which movements of the terminal fitting and the braided member relative to each other are suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal fitting fixing structure comprising:
a braided member covering part of a cable including a core and an insulator, the braided member being formed by braided metal wires;
a spacer having a first cylindrical portion through which the braided member passes, and a first flange protruding radially outward from an end on a first side of the spacer in an axial direction;
a terminal fitting having a second cylindrical portion through which the braided member passes, and a second flange electrically connected with a ground member and protruding radially outward from an end on a second side of the terminal fitting in the axial direction; and
a sleeve through which the second cylindrical portion passes in a state in which an end of the braided member on the first side being folded back is sandwiched between the sleeve and the second cylindrical portion on the first side in the axial direction of the terminal fitting, wherein
the first cylindrical portion of the spacer is deformed radially inward to form a crimped state of the braided member between the spacer and the cable, and
the sleeve is deformed radially inward and forms a crimped state of the braided member at least between the sleeve and the terminal fitting in a contact state in which the second flange is in contact with the first flange.

2. The terminal fitting fixing structure according to claim 1, wherein
the end of the braided member on the first side is at least partially in contact with the second flange.

3. The terminal fitting fixing structure according to claim 1, wherein
the second flange has a radially outer end protruding toward the second side along the axial direction, and covers a radially outer end of the first flange.

4. The terminal fitting fixing structure according to claim 2, wherein
the second flange has a radially outer end protruding toward the second side along the axial direction, and covers a radially outer end of the first flange.

5. A wire harness comprising:
a cable including a core and an insulator;
a braided member covering part of the cable and being formed by braided metal wires;
a spacer having a first cylindrical portion through which the braided member passes, and a first flange protruding radially outward from an end on a first side of the spacer in an axial direction;
a terminal fitting having a second cylindrical portion through which the braided member passes, and a second flange electrically connected with a ground member and protruding radially outward from an end on a second side of the terminal fitting in the axial direction; and
a sleeve through which the second cylindrical portion passes in a state in which an end of the braided member on the first side being folded back is sandwiched between the sleeve and the second cylindrical portion on the first side in the axial direction of the terminal fitting, wherein
the first cylindrical portion of the spacer is deformed radially inward to form a crimped state of the braided member between the spacer and the cable, and
the sleeve is deformed radially inward and forms a crimped state of the braided member at least between the sleeve and the terminal fitting in a contact state in which the second flange is in contact with the first flange.

* * * * *